April 20, 1937.  W. W. LASKER  2,078,084
CARD VERIFIER
Filed Nov. 1, 1935  8 Sheets-Sheet 1

FIG. I.

WITNESSES

INVENTOR
W. W. LASKER
BY
HIS ATTORNEY

April 20, 1937. W. W. LASKER 2,078,084
CARD VERIFIER
Filed Nov. 1, 1935 8 Sheets-Sheet 5

INVENTOR
W. W. LASKER
BY *H. A. Spark.*
HIS ATTORNEY

April 20, 1937.   W. W. LASKER   2,078,084
CARD VERIFIER
Filed Nov. 1, 1935   8 Sheets-Sheet 7

WITNESSES
John H. Oakes
H. D. Hineline

INVENTOR
W. W. LASKER
BY W. A. Sparks
ATTORNEY

April 20, 1937.  W. W. LASKER  2,078,084
CARD VERIFIER
Filed Nov. 1, 1935  8 Sheets-Sheet 8

INVENTOR
W. W. LASKER
BY
HIS ATTORNEY

Patented Apr. 20, 1937

2,078,084

UNITED STATES PATENT OFFICE 2,078,084

CARD VERIFIER

William W. Lasker, Brooklyn, N. Y., assignor to Remington Rand Inc., Buffalo, N. Y., a corporation of Delaware Application November 1, 1935, Serial No. 47,752

12 Claims. (Cl. 73—51)

This invention relates to punched card tabulating machinery, and particularly to a verifier mechanism for proving the correctness of the punched data on tabulator cards.

The punched card accounting system utilizes cards upon which desired business records are indicated by means of significant perforations made therein, the position of the perforations in columns, fields and zones being utilized to indicate both numeric and alphabetic data. The cards are prepared by a punching mechanism actuated by an operator who transcribes the desired data from business records to the cards. The cards are thereafter sorted by a mechanical sorter to select the desired transaction records, and the records are thereafter tabulated by the tabulator machine to yield a typed transaction record including totals, and, if desired, including also listings of the items recorded on the individual cards. Thus, it will be obvious that the accuracy of the tabulator records is dependent upon the accuracy of the original recording of the data in the cards.

In consequence, the punched card tabulator system frequently utilizes the additional step of card verification to prove the correctness of the data recorded on the cards.

The present invention discloses a new, improved and simplified form of card verifying machine.

Broadly the machine consists of a frame, carrying a sliding card holder, under the control of an escapement mechanism. The machine also contains keys for the various digits (and if desired, for the letters as well) which cooperate with feeler members which sense the presence or absence of the perforations in the card, and a comparison mechanism which, upon failure of agreement between a depressed key and a card column perforation, serves to throw out of operation the escapement mechanism, thereby ejecting the card from the sensing position immediately upon the appearance of an incorrect perforation. The machine also includes a special punch which produces a nick, or perforation, at a special point in the card to indicate that the card has been brought into the sensing chamber for verification.

The machine is particularly adapted to determine both the presence of improper or incorrect perforations, and the absence of proper perforations, and is particularly adapted to the verifying of perforations according to a multi-unit code, particularly the code shown in my Patent No. 1,780,621 for the so-called "90-column code" punchings.

An object of the invention is to simplify the mechanism in a card verifying machine.

Another object of the invention is to adapt a card verifying machine to operation according to multi-unit code.

Still another object of the invention is to adapt a card verifier to operation according to the 90-column code; and in upper and lower zones.

A further object of the invention is to incorporate in the card a special perforation to indicate that the card has been brought into the sensing chamber for verification.

Still a further object of the invention is to simplify the indication punching mechanism.

Still a further object of the invention is to provide mechanism for ejecting the card from the sensing position upon detection of an incorrect perforation.

Yet another object of the invention is to traverse a card, column by column, beneath a row of verifying feeler members, and to operate an escapement mechanism for movement of the card, column by column, as columns of correct punchings are sensed, and to release the escapement mechanism for ejection of the card upon the perception of an incorrect perforation.

The machine of the invention consists broadly of a frame, having a sliding card carrier under control of an escapement mechanism, and a row of sensing pins. There is also provided a group of keys, which may consist of a single group of digit keys, or may consist, as shown in the drawings, of two groups of digit keys respectively for upper or lower zones, or may, if desired, consist of both numeric and alphabetic keys. The keys cooperate with the sensing pins through a mechanism which will release the escapement if the sensing pin, or pins, corresponding to the depressed key do not find perforations in the card, or if a pin, or pins, not corresponding to the key depressed do find perforations in the card. The machine also contains a simple mechanism for introducing into the card, a notch or perforation when the card is inserted, in the verifier to show that it has been verified. In addition, the machine contains a simple tabular stop mechanism for selecting any desired column in a given field.

The machine thus provides a mechanism of superior convenience, simplicity, ease of operation and cheapness over prior verifiers, as well as a simple mechanism for verifying upper and lower zones, according to a multi-unit code. These improvements are obtained by the incorporation in the machine of a card carrier and escapement mechanism, a set of manually operable insignia keys, feeler pins, and a linkage mechanism cooperating between the keys, the feeler mechanism, and the escapement, to release the escapement for full travel of the card carriage when an incorrect perforation appears in a card column.

Other objects and structural details of the invention will be apparent from the following description, when read in connection with the accompanying drawings, wherein.

Figure 1:
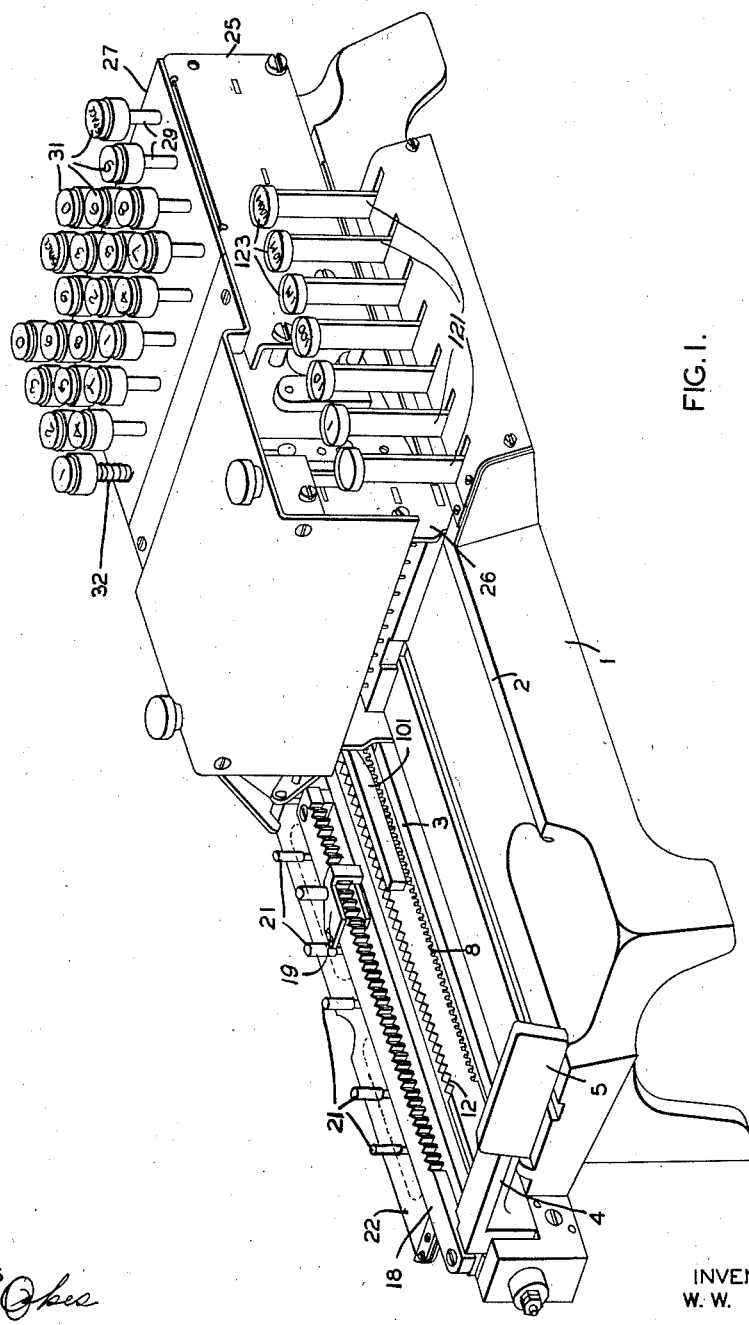
Fig. 1 is a front view, in isometric projection, of the machine of the invention.
Figure 2:
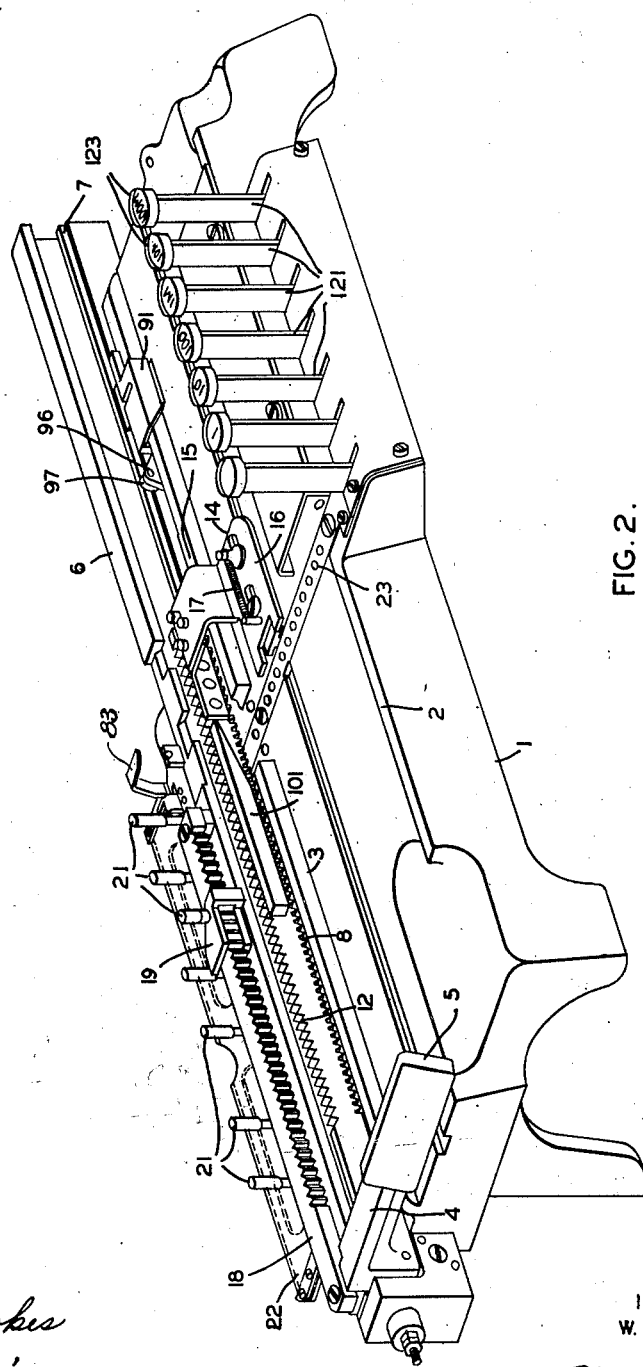
Fig. 2 is a front view, in isometric projection, of the frame, card carriage, escapement, and punch member.
Figure 3:
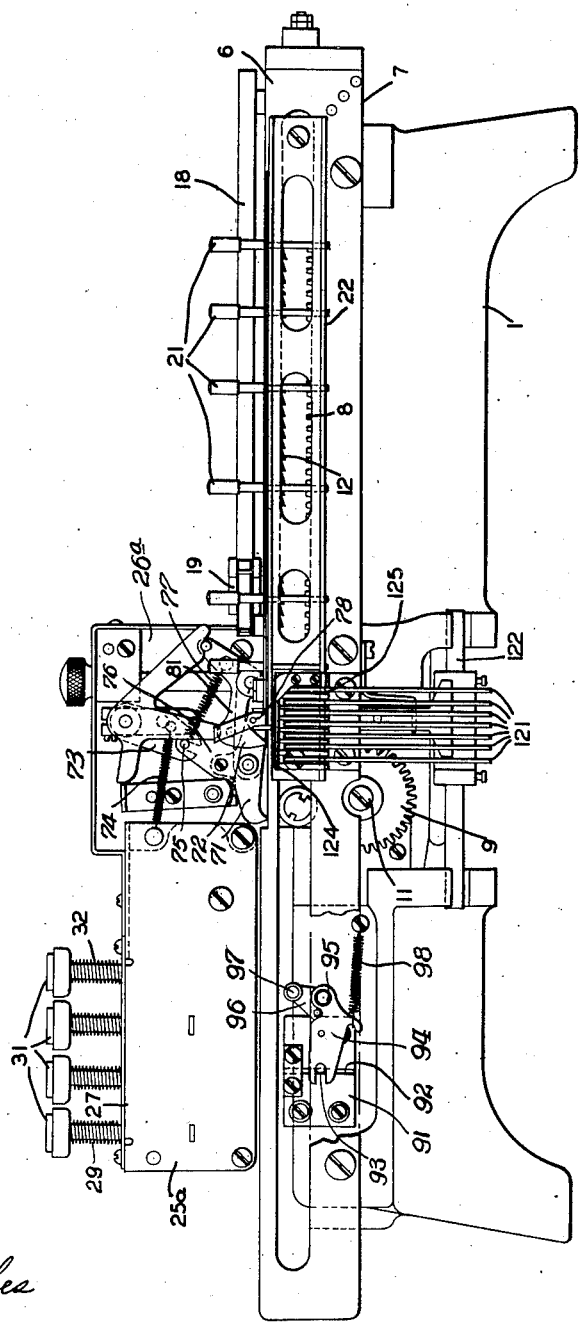
Fig. 3 is a view, in rear elevation, of the machine of the invention showing the escapement mechanism, escapement release, tabular stop mechanism, and punch mechanism.

Referring to the drawings, the machine consists of a main frame member 1, which may, as shown, have integral feet members to carry the frame top in a slanting position. The top of the frame 1 has a flat surface portion between ridges 2 and 3 equal to the width of a standard tabulator card plus a very small clearance, and a length approximately equal to, or a little more than, twice the length of a standard tabulator card. A card frame 4, having a handle 5, is provided and mounted in upper and lower guides 6 and 7, as is particularly well shown in Fig. 2. Frame 4 has on its lower edge a gear rack member 8 adapted to cooperate with a gear 9 journaled on a bearing 11, Fig. 3. The gear 9 is in the form of a drum, and has therein a tension spring member (not shown) tending to advance the frame member 4 towards the left, as shown in Figs. 1 and 2, and to the right as shown in Fig. 3. The frame member 4 has on its upper edge an escapement rack 12 which cooperates with an escapement mechanism, as shown in Fig. 3, which will be later described in detail. The frame 4 also has, at its right-hand end, a card gripping mechanism 14, consisting of a member 15 attached to the frame 4, and a slide 16 actuated by a spring 17 to grip a card between the left-hand ends of the members, as shown particularly in Fig. 2. The frame 4 also has attached to its upper end, a margin stop mechanism, consisting of a notched bar 18, and an adjustable stop member 19, also as shown in Fig. 2. There are also provided adjustable tabular stop pins 21, carried in a frame 22, as shown in Figs. 1, 2 and 3. The frame member 1 also has an inset 23 put in transversely of the length of the top surface, with holes therein, to receive the lower ends of such sensing pins as pass through holes in the sensed card.

Figure 4:
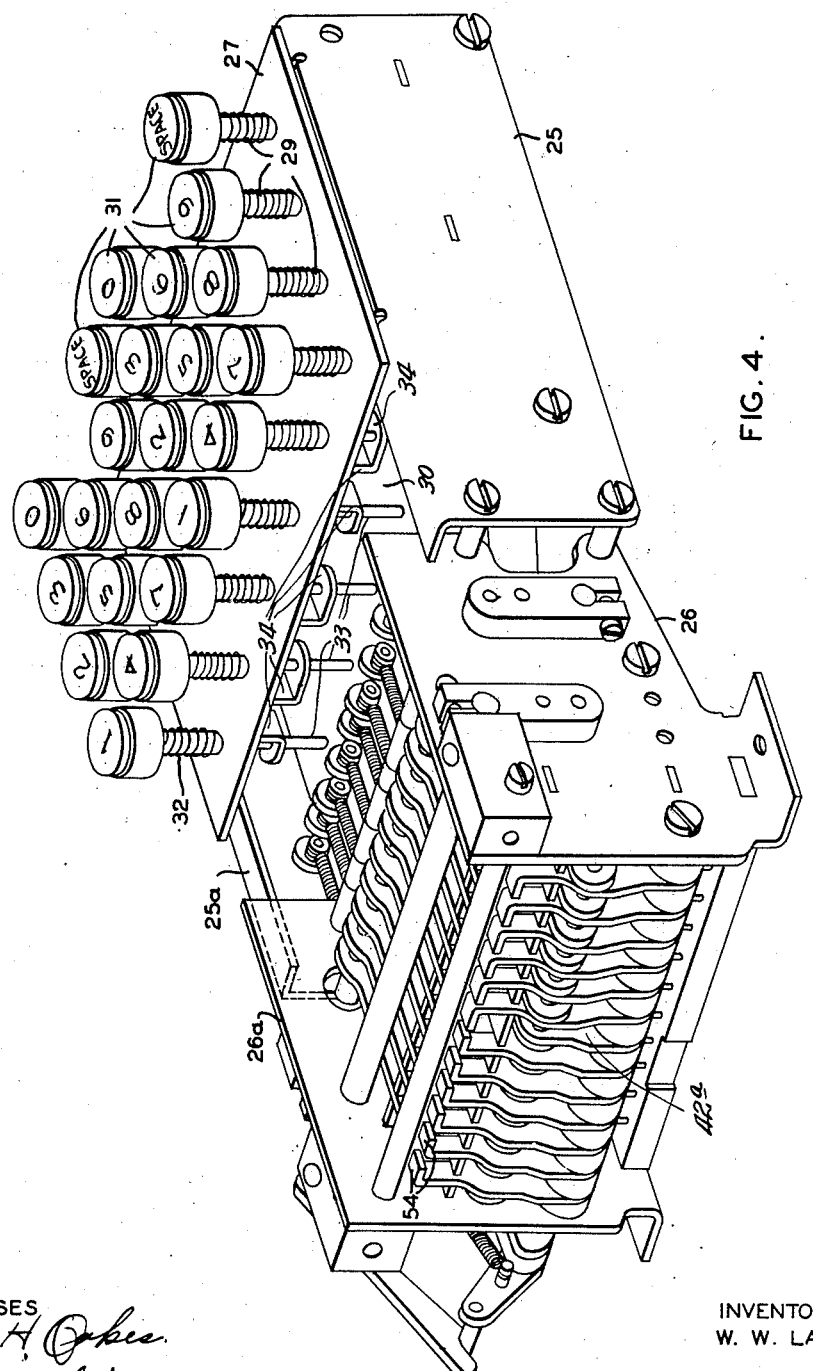
Fig. 4 is a front view, in isometric projection, of the key members and the linkage mechanism between the keys and sensing pins.
Figure 5:
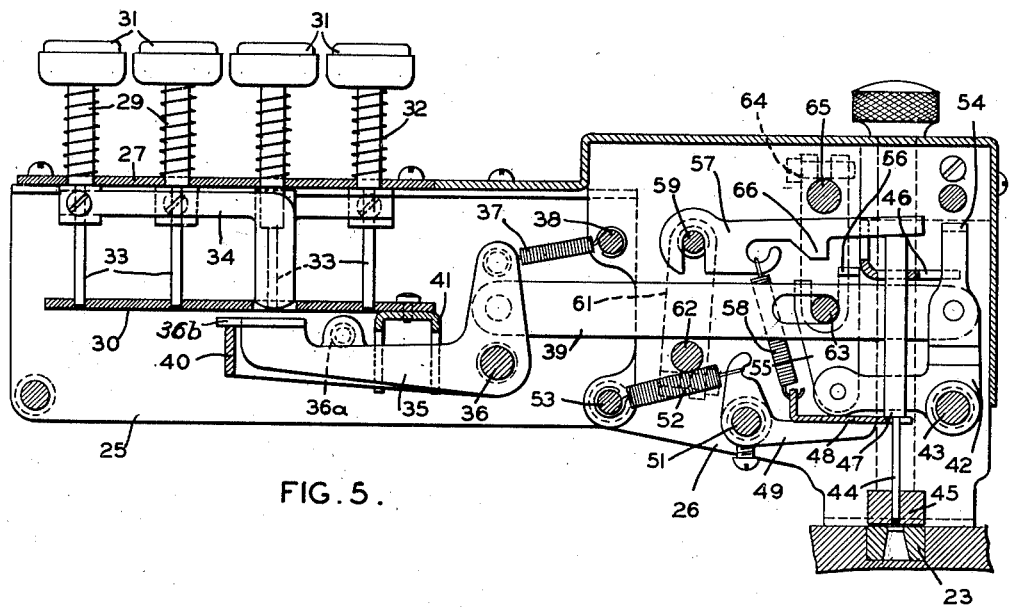
Fig. 5 is a side view, partly in section, of the keys, feeler members, and linkage therebetween.

Upon the right-hand end of the frame member 1, there is mounted the key action and sensing mechanism, as shown in Figs. 1, 4 and 5. This mechanism consists of frames 25, 25a, 26 and 26a, which are held in proper relationship by through bolts, as shown. Above the frames 25 and 25a there is positioned a key plate member 27 having openings through which the key stems 29 project to carry the eleven finger keys 31 for each field, twenty-two in all, as shown. Each key stem 29 is surrounded by a spring 32, as indicated for the upper left-hand key.

Referring to Fig. 5, each key stem 29 is provided with a key tail 33, guided in a plate 30, and each key stem carries an extension member 34 of L-shape, such that the depending portions of the several extension pieces 34 are positioned in a transverse row.

Lever members 35 are provided, journaled upon a transverse shaft 36. For the standard tabulator card, having twelve positions in each full vertical column, but thirteen finger keys 31 are required, twelve for the usual numbers indicated on a tabulator card, and one for the space, and for them thirteen levers 35 are provided. For the 90-column upper and lower fields shown in the drawings, eleven levers 35 are provided, one for each finger key, ten being for the customary digits and one for the space key as shown, but only seven are connected directly to the subsequent operating mechanism. The other four, corresponding to the even-number digits, are connected by a pin 36a to the next lower, odd numbered, lever, in such manner as to carry the odd-number lever down when the even-number lever is depressed. Each even-number lever also has a projection cooperating with the bail 40 to carry it downward also, when the lever is depressed.

Figure 9:
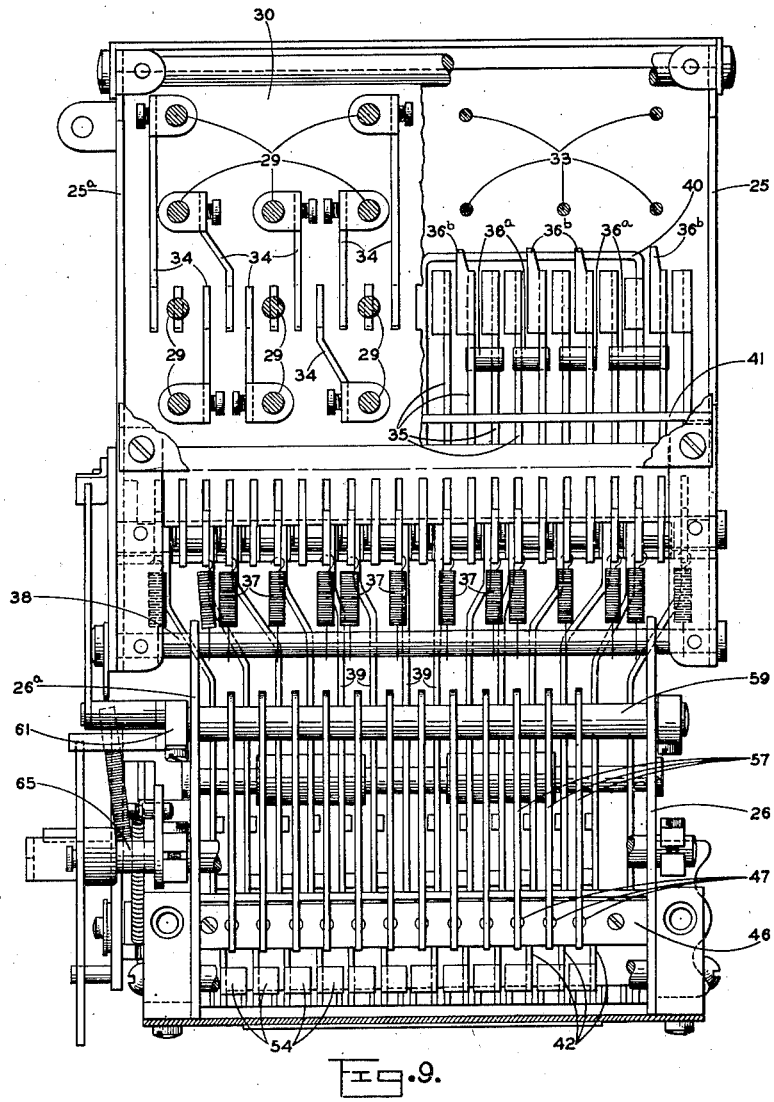
Fig. 9 is a top view in section of the keyboard and feeler pin mechanisms.
Figure 10:
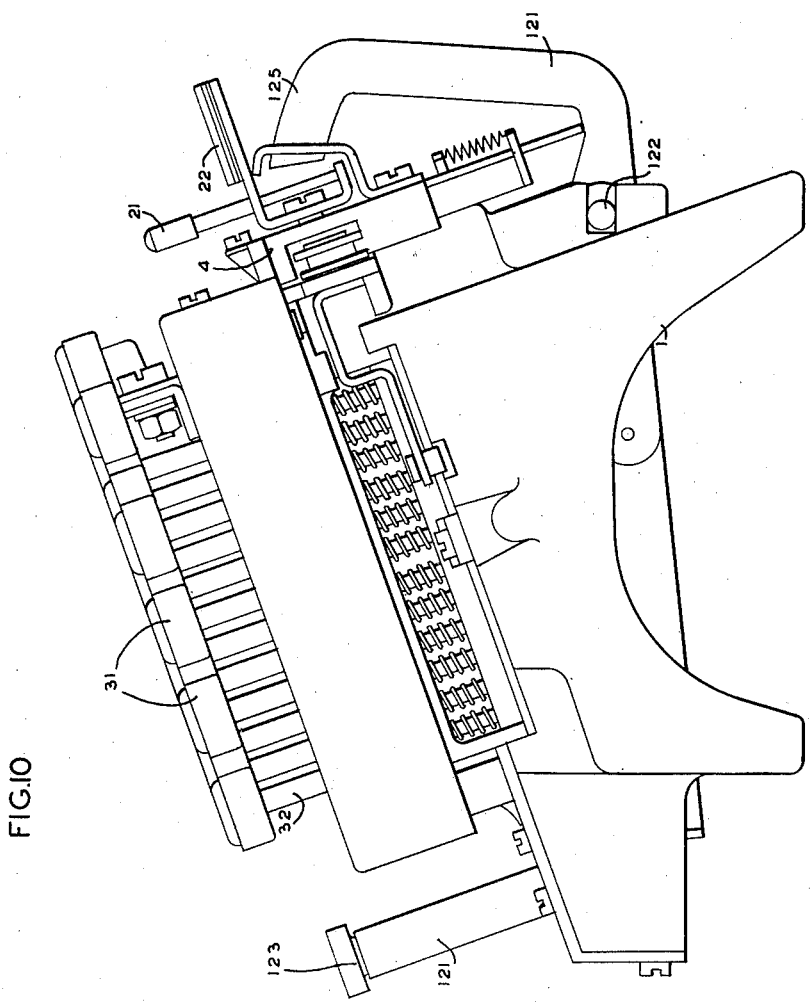
Fig. 10 is a side elevation of the machine showing the tabulating mechanism.

As is shown in the above mentioned Patent Number 1,780,621, the upper and lower 90 column code is a 2 unit code utilizing six positions, a perforation in the highest position representing the zero, a perforation in the next highest position representing the digit 1, two perforations, one in the second highest position and one in the lowest position representing the digit 2, a perforation in the third position representing 3, two perforations, one in the third position and one in the lowest position representing the digit 4, one perforation in the fourth position representing the digit 5, two perforations, one in the fourth position and one in the lowest position representing the digit 6 and so on, the digit 9 being represented by a single perforation in the lowest position. Thus four of the ten digits are represented by two perforations, in each instance one of those perforations being in the position which represents the 9 digit when present alone, the other four perforations being located in four of the remaining five positions. The structure for sensing this multi-unit code is particularly well shown in Figs. 5 and 9, the even numbered digits being tested by depression of the appropriate key 31 which in turn depresses the corresponding lever 35. This lever 35 however has no link 39 attached thereto, but has instead a cross pin 36a which contacts with the lever 34 for the next lower digit, and also a projection 36b which contacts with the bail 40 which is a part of the lever 35 for the pin in the 9 or lowest position.

The bail 40 thus is attached to and actuates the lever 35, for the 9 digit. As will be obvious from consideration of the code shown in the above mentioned patent, the sixth lever and twelfth lever from the top must thus cooperate with several of the members 34, because of the fact that the code requires a perforation in the sixth level in the column for all of the even numbered digits, as well as for the digit 9, to indicate numbers in the upper zone, and similarly a perforation in the twelfth or bottom position for all of the even numbered digits, and the digit 9 in the lower zone. Thus, to recapitulate for this purpose, the sixth and twelfth levers 35 respectively have extensions or bails 40, positioned along the ends of the respective groups of the levers 35, and the even digit levers 35 have extensions of the portions 36b adapted to cooperate with the bails 40 to carry with them the sixth and twelfth levers respectively. The levers 35 are adapted to be rocked counterclockwise, as shown in Fig. 5, by depression of the keys 31.

The levers 35 are, as shown in Fig. 5, of bell crank type, having a horizontal portion to be actuated by the keys, and a vertical portion. The upper end of each vertical portion is perforated and a spring 37 is connected between the lever top and a cross bar 38. Twelve pull links 39 are likewise provided, one pull link 39 being pivotally attached to each lever 35. A double guide comb 41 is provided for the levers 35.

The links 39 extend from the frame 25—25a into the frame 26—26a, where each is attached to one of another series of bell crank levers 42. The bell crank levers 42 are journaled upon a cross rod 43. Adjacent the levers 42 there are provided a set of feeler pins 44 which are guided in a perforated bar member 45 and a guide plate 46. As shown, the upper portion 47 of each feeler pin is enlarged and the enlarged portion rests upon the bail plate 48. In the present embodiment, two bail plates 48 are provided, each bail plate carrying six of the feeler pins 44—47 (in the event that single unit or 45-column code is to be verified, a single bail 48 carrying all twelve feeler pins is utilized, and if three zones are utilized upon the card, as shown in my co-pending application Serial No. 616,927, filed June 13, 1932, now Patent No. 2,027,916, three bails 48 may be utilized, each bail supporting four pins). The bail plates 48 are carried upon other bell crank levers 49 which are mounted upon a cross rod 51, and urged upward by springs 52 co-acting between the tails of the bell crank levers 49 and another cross rod 53. Each bell crank lever 42 has, at the top of its vertical portion, a bent over member 54, as is particularly well shown in Figs. 4 and 8. The horizontal portion of each lever 42 has thereon, one of a series of twelve link members 55 each of which likewise has a turned-over portion 56 and a slot straddled over the rod 63. Over each sensing pin 44—47, there is provided a lever member 57 urged downward by a spring 58, and latched to still another cross rod 59, which cross rod in turn is carried upon swinging lever members 61 clamped to a cross shaft 62.

The cross rod 63 is carried upon swinging lever members 64, which in turn are clamped to another shaft member 65.

It will be obvious that if, with a card in the machine, a key lever 31 is depressed, a lever 35 is rotated counterclockwise, a link 39 is drawn to the left (as shown in Fig. 5), and a corresponding lever 42 is rotated counterclockwise to push down the bail member 48, thus allowing pins 44 to pass through such perforations as exist in the card.

If the perforation, or perforations are correct, and correspond to the perforations required for the key 31 which is depressed, the lever member 57 which moves downward with such pin or pins 44 as find a perforation, brings the right-hand end of the lever 57 below the bent-over portion 54 out of the path of its movement when it is moved to the left by the counterclockwise rotation of lever 42, and the escapement mechanism, to be later described, acts, and no further response occurs. If, however, a pin 44 corresponding to the key 31 which is depressed does not find a hole, that is, a hole which should be present is lacking, the pin member 47 does not drop downward, the lever 57 does not move, and the bent-over portion 54 contacts with the end of the lever 57 to push it to the left, thereby carrying the cross rod 59 with it, and rotating the shaft 62 counterclockwise to release both escapement pawls and eject the card. Similarly, if a perforation occurs which should not be present, the pin 44 enters it, and lowers the lever 57. Under these conditions the lever 42 corresponding to the incorrect perforation is not moved, and accordingly the member 55 is not drawn downward, and the bent-over end 56 of the member 55, as it is moved to the left by rod 63, under the pull of a link 39 produced by depression of a key 31, contacts with the lug 66, to move the lever 57 to the left, move the cross rod 59 to the left, and rotate the shaft 62 to release both escapement pawls and eject the card.

The above procedure is that which occurs when a digit is verified in a given column. Sometimes, however, certain columns are skipped, and no digits are included therein, this is especially the case where a given field provides room for numbers of considerable size, for example five, six or seven digits, and the number recorded therein is of say two or three digits only. Secondly, several of the columns on the left hand side of the field record no digits and contain no perforations, since it is not customary to punch zeros in such parts of the field. Accordingly, the space key as shown in Figs. 1 and 4, is provided. However, no pins 44 will find perforations, and no sensing pin 44 is provided to cooperate with the space key 31. Accordingly, no bent-over member 54 as shown in Fig. 5 need be provided since there is no pin 44 for the space key and similarly no turned-over portion 56 need be provided to cooperate with the space key. Instead there is provided merely the short lever 42a as shown in Fig. 4, for each field, the second of the levers 42a being hidden behind the frame 26. Thus, actuation of the space key depresses the bail member 48 leaving the pins which find wrong perforations free to move downward. Simultaneously, the link member 55 connected to the bell crank lever 42 moves the rod 63 to swing all of the turned-over portions 56 which have levers 57 for cooperation therewith in the normal fashion. Accordingly, if any of the pins 44 have found perforations and lowered their members 57, the corresponding member 56 engages with the catch 65 to produce the same response as above described.

Figure 8:
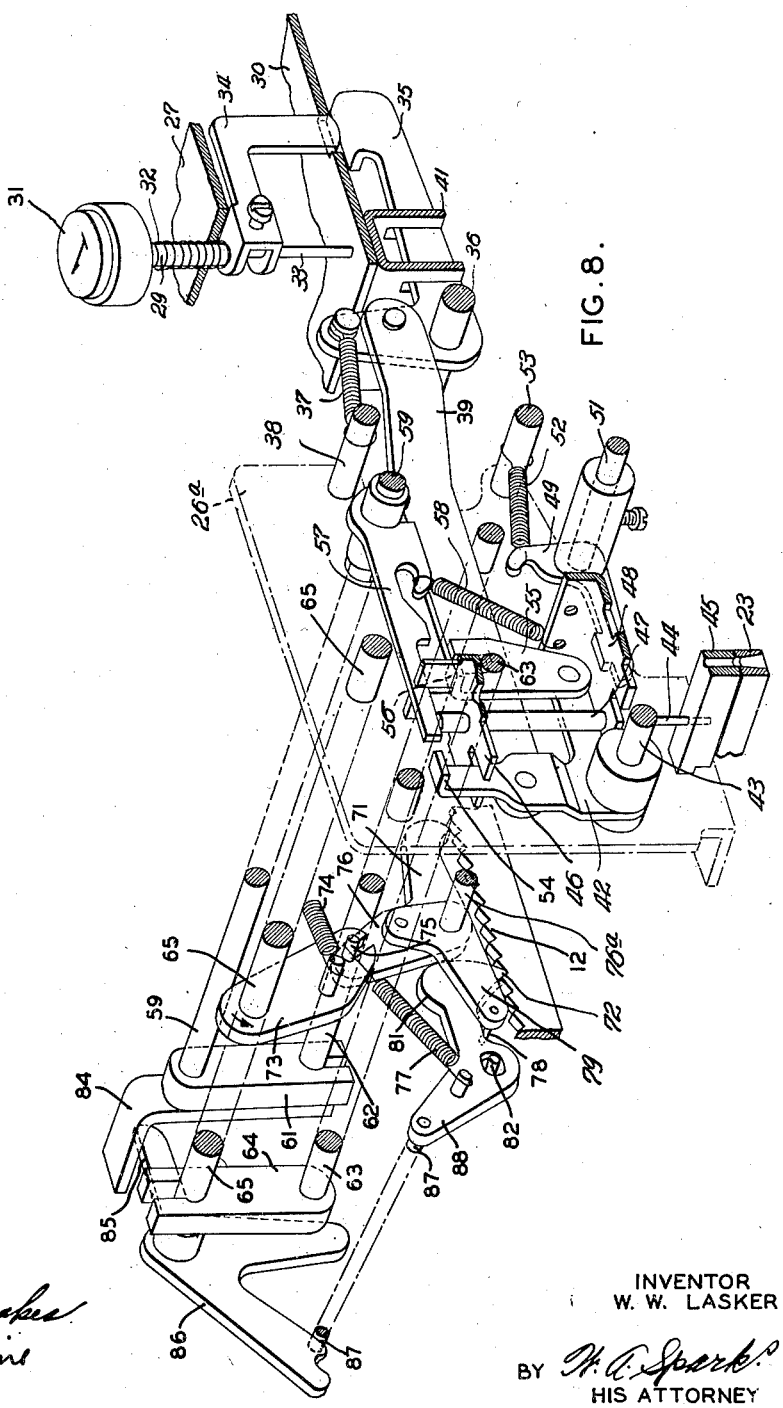
Fig. 8 is a skeleton view, in orthographic projection, of the escapement mechanism, the feeler pins, the key members, and the linkage mechanism therebetween.

The escapement mechanism is best shown in Figs. 3 and 8. The escapement rack 12 has cooperating therewith, a pair of escapement pawls 71 and 72. It will be observed that each link 39 has, near its right-hand end (as shown in Fig. 5) a slot through which the shaft 63 passes so that when a key 31 is depressed to pull a link 39 to the left, it likewise moves the cross rod 63 to the left, as shown in Fig. 5, (but to the right as shown in Fig. 8), and causes the swinging lever 64 to rotate the shaft 65 clockwise (as shown in Fig. 5). Clockwise movement of the shaft 65 (as shown in Fig. 5, counterclockwise as shown in Fig. 8) swings a lever 73 counterclockwise (as shown in Fig. 8) with the aid of the tension of a spring 74, and carries with it a pin 75, mounted on the lever 76, which cooperates with the slot shown in the lever 73 to swing a lever 76 (journaled on a pin 76a together with the lever 79, the two members 76 and 71 being one integral part) in clockwise direction against the tension of a spring 77. Clockwise movement of the lever 76 brings the escapement pawl 71 into engagement with the rack 12 without permitting movement of the rack, and simultaneously the pin 78, on the tail of the lever 79, lifts the escapement pawl portion 72 of the lever 81. The pawl portion 72 of the lever 81 is carried upon a pin 82 by means of a slot which permits a small amount of movement by the pawl portion 72 of the lever 81 in the direction parallel to the length of the rack 12. This movement may conveniently be about 1/32 of an inch, and should be sufficient to bring the tip of the pawl portion 72 of the lever 81 beyond the notch in the rack 12 in which it previously lay, and over the top of the next adjacent rack tooth. The energy for this movement is provided by the spring 77. When the depressed key 31 is released the link member 39 moves toward the right, as shown in Fig. 5, and toward the left as shown in Fig. 8, releases the cross rod 63, the shaft 65, the lever 73, and the lever 76, to raise the pawl 71 out of contact with the rack 12, and drop the pawl portion 72 of the lever 81 into engagement with the rack to enter the next adjacent rack notch against the next adjacent racktooth under the urge of the spring in the gear drum 9, thereby to carry the card forward by one column.

As pointed out in connection with Fig. 5, when a correct perforation is found, and no incorrect or improper holes appear, no other action occurs. When improper punching is sensed, however, either the absence of the required hole, or the presence of an improper hole, the mechanism in the frame 26—26a causes a counterclockwise rotation of the shaft 62, as shown in Fig. 5, a clockwise rotation of the shaft 62, as shown in Fig. 8, to carry the rod 59 to the right, as shown in Fig. 8, and with it the catch member 84 also to the right and away from a position over the tail member 85 of the lever 86. This frees the lever 86 and permits it to drop downward to engage with the pin 87 on the tail 88 of the escapement pawl 81, locking it in disengaged position. Accordingly, it is not free to arrest the rack 12 when the pawl 71 is disengaged therefrom by release of a key 31, and the escapement rack is free to move to its final position to the left, as shown in Fig. 1, under the urge of the spring in the gear drum 9, as shown in Fig. 3, thereby ejecting the card from the machine, or bringing it into eject position for removal by the operator. After ejection of the card, this movement of the frame 4 carries with it the release member 83 as particularly shown in Fig. 2, and this member cooperates with the lever 86, moving it to its release position, thereby freeing the pin 87 and permitting the lever 88 and escapement pawl 72 to return to normal position. Thereafter the upward movement of the key 31 and its associated linkages restores the levers 57 and the cross bar member 59 to their original position, thereby bringing the member 84 back over the tail 85 to hold the lever 86 to its original position. The mechanism is thus returned to its original position preparatory to operation upon another card.

Figure 6:
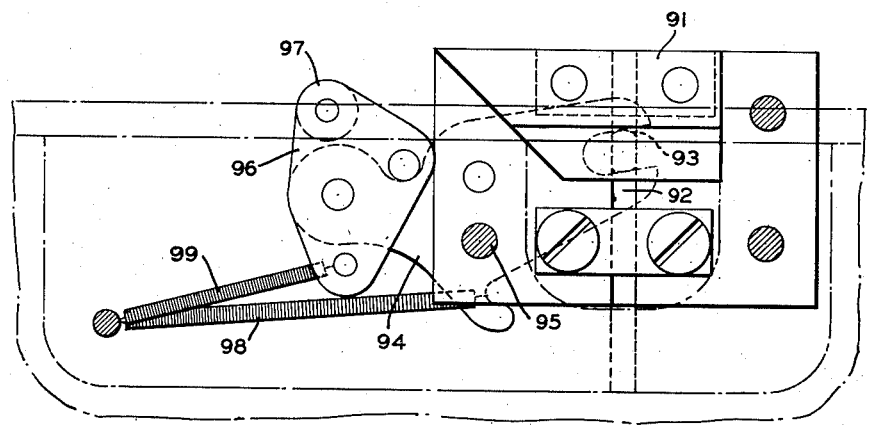
Fig. 6 is an enlarged view partly in section, of the punch mechanism.
Figure 7:
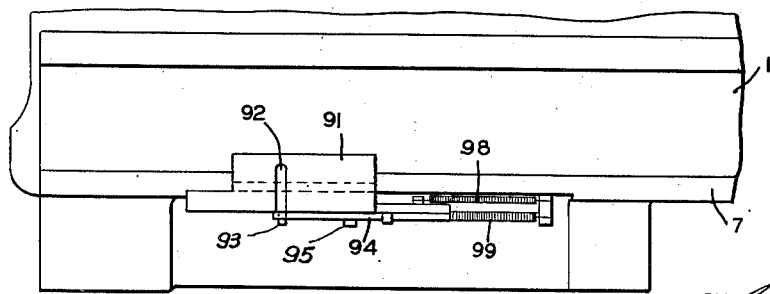
Fig. 7 is an enlarged top view of the punch mechanism.

A marking punch mechanism, shown in Figs. 2, 6 and 7, is also provided. As shown in the figures, this consists of a die and frame member 91 placed in a recess in the rear guide rail 3 near the right-hand end of the upper surface of the base member 1. Within the die member 91 there is positioned a punch member 92 having a projecting lug 93. Cooperating with the lug 93 is a lever member 94 journaled on a pivot 95. On the opposite end of the lever 94 there is pivoted a plate member 96 having thereon a contact roller 97. Springs 98 and 99 tend to depress the punch member 92 below the level of the top surface of the frame member 1, to hold the punch 92 withdrawn from the die 91. On the card frame 4 there is mounted an operating member 101, as shown in Figs. 1 and 2 which cooperates with the roller 97 to depress the member 96, and thereby to lift the punch 92 into the die 91.

When the card to be verified is inserted into the frame, it is caught under the member 16 and held accurately positioned between the member 16 and the right-hand face of the frame 4, adjacent the handle 5. The operator then moves the frame to the right by pressure upon the handle 5, and in so doing winds up the spring in the gear drum 9 and conveys the card under the die 91. Before the card has been conveyed under the die 91, however, the inclined lower surface of the member 101, having contacted with the roller 97, actuates the levers 96 and 94 to raise the punch into the upper portion of the die 91 until a notch in the punch is located even with the surface of the frame, whereupon the edge of the card passes through the notch in the punch. At the end of the travel of the card toward the right, the roller 97 passes off of the left-hand end of the member 101, allowing the springs 98 and 99 to depress the punch 92, thereby notching the card on its upper edge near the right-hand end. When the card is fully inserted into the machine, which limit may be set by the member 19, if desired, the escapement ratchet comes into play and holds the frame in position with the first row of perforations over the inset 23 under the feeler pins 44. Thereupon, the operator depresses the keys according to the indications of the original data record from which the card was previously made. If the perforations are correct, the escapement passes the card toward the left, column-by-column, until all of the perforations have been tested by the feeler pins and compared with the digital indications given by the depressed keys, as previously described. If, however, an error is found, the frame 4 is released to permit the full extent of travel toward the left, as above described, thereby indicating to the operator that there is an error in the card. Each card which has been verified is marked with a punch mark, or nick, to show that fact, and, of course, incorrect cards, even though they are marked as having been verified, are destroyed and replaced with correctly punched cards.

In some instances it is desirable to verify certain columns only, and to simplify the selection of the desired columns, the tabular stop mechanism, shown in Figs. 1, 2 and 3, is utilized. As indicated, this mechanism consists of tabular stop pins 21, cooperating with tabular levers 121 which are pivoted on a shaft 122, and carry finger keys 123, as shown in Figs. 1 and 2. As indicated in Fig. 3, the rear ends of the levers 121 cooperate with a member 124 which will raise the escapement pawl 81 to release the frame 4. Simultaneously the projections 125 on the levers are lifted to cooperate with the lower ends of the pins 21 and arrest the frame 4 at the desired position. As indicated, each pin 21 may be set opposite the first column in the desired card field, whereupon depression of the key 123 marked "1" will bring the units column in that field under the feeler pins. Similarly, depression of the key marked "10" will bring the tens column under the feeler pins etc., preparatory to verification of that particular column, and such succeeding columns as are desired.

By the structure of the invention, there is thus provided a simple, inexpensive, efficient, punch card verifying machine which is adapted to operation according to a multi-unit code, or according to other types of codes for the verification and marking of a card with the added feature of simple tabular means for selecting columns to be verified.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In combination, a set of key members, an escapement mechanism having a rack member, a plurality of escapement pawls and a release shaft, a set of sensing pins and mechanism cooperating therebetween comprising a bail for supporting said pins, spring pressed levers for depressing said pins, link and lever mechanisms respectively connected to the keys of said set for the actuation of said bail, said link and lever members comprising members adapted to rotate said release shaft when a pin corresponding to a depressed key does not find a perforation, or when a pin not corresponding to a key does find a perforation.

2. In combination, a set of key members, an escapement mechanism having a rack member, a plurality of escapement pawls and a release shaft, a set of sensing pins and mechanism cooperating therebetween comprising a bail for supporting said pins, spring pressed levers for depressing said pins, link and lever mechanisms respectively connected to the keys of said set for the actuation of said bail, said link and lever members comprising members adapted to rotate said release shaft when a pin corresponding to a depressed key does not find a perforation, or when a pin not corresponding to a key does find a perforation, said escapement mechanism being adapted to pass single rack teeth when the said rotatable shaft is not rotated, and to pass all of the remaining teeth when said rotatable shaft is rotated.

3. In combination, a frame, guides thereon, and an auxiliary slidable member therein adapted to hold and traverse a tabulator card, a plurality of sensing pins cooperating therewith, a plurality of key members adapted to cooperate with said pins for the indication of data according to a multi-unit code, and link and lever mechanism comprising levers having side pins for actuating other levers and projections and a bail for actuating still another lever cooperating between said keys and said pins to compare the presence or absence of single perforations for certain keys and of multiple perforations for other keys.

4. In combination, a frame, guides thereon, and an auxiliary slidable member therein adapted to hold and traverse a tabulator card, a plurality of sensing pins cooperating therewith, a plurality of key members adapted to cooperate with a portion only of said pins for the indication of data according to a multi-unit code, and link and lever mechanism comprising levers having side pins for actuating other levers and projections and a bail for actuating still another lever cooperating between said keys and said pins to compare the presence or absence of single perforations for certain keys and of multiple perforations for other keys.

5. In a card verifying machine, card carrying and traversing means, a plurality of feeler pins cooperating therewith, a plurality of manually operable key members, and mechanism comprising levers having side pins for actuating other levers and projections and a bail for actuating still another lever for comparing the indications of said feeler pins and the depression of said keys to determine the presence of one perforation only for certain keys and two perforations only for other keys in proper columnar position.

6. In a card verifying machine, card carrying and traversing means; a plurality of feeler pins cooperating therewith; a plurality of manually operable key members; mechanism for comparing the indications of said feeler pins and the depression of said keys to determine the presence of one perforation only for certain keys and two perforations only for other keys in proper columnar position, comprising spring pressed levers bearing upon said feeler pins; a movable cross shaft with said levers journaled thereon; catches and a cross bar for actuating a plurality of levers in response to the depression of one key; levers cooperating with said keys, said latches and said cross bar; a bail member for lowering said feeler pins into engagement with a card; lever members cooperating between said key actuated levers and said bail; a plurality of push members cooperating between said bail actuating levers and said feeler pin levers; and an escapement mechanism cooperating with said pin lever carrying rod.

7. In a card verifying mechanism, an escapement device and a plurality of escapement release means, one thereof being adapted to operate said escapement step by step, and the other being adapted to release fully said escapement mechanism to permit maximum travel thereof, said escapement mechanism comprising a rack and a pair of alternatively operable escapement pawls, said first mentioned release means comprising a swinging lever coupled to said pawls for advancing one pawl into engagement with said rack while releasing the other of said pawls, and thereafter engaging said second mentioned pawls with said rack at a different tooth and withdrawing said first mentioned pawl, said second releasing means comprising a latch member adapted to prevent reengagement of said second mentioned pawl with said rack.

8. In a verifying mechanism, a plurality of feeler pin members, a plurality of spring pressed pin depressing levers, a movable shaft for the support of said pin levers, and a pair of lever members and a link member coupled to a key member for moving said pin lever to move said shaft, one of said members cooperating with said shaft when a pin is wrongly dropped and the other cooperating with said shaft when said pin is wrongly held up.

9. In a card verifying machine, a column of feeler pins and a plurality of bail members cooperating with portions only of said column of pins for the release of part only of said pins to sense perforations in a card column.

10. In a card verifying machine, a column of feeler pins, a plurality of bail members respectively cooperating with portions only of said column of pins for the release of part only of said pins to feel for perforations in a card column, and a plurality of sets of manually operable keys, respective sets respectively cooperating with the feeler pins controlled by the respective bail members.

11. In a card verifying machine, a plurality of key levers, a plurality of keys for the actuation thereof, a cooperating member upon one thereof, and extension members upon certain only of said levers for the operation of a plurality of levers upon the depression of the single key.

12. In a verifying mechanism, a single column of feeler pins, means comprising a pair of bail members for dividing said column into upper and lower zones, and a plurality of sets of manually operable key members respectively cooperating with said upper and lower zone divisions of said feeler pins.

WILLIAM W. LASKER.